Feb. 28, 1933.   T. O. MACKEY ET AL   1,899,343
METHOD OF MAKING A CONNECTION
Filed June 14, 1930
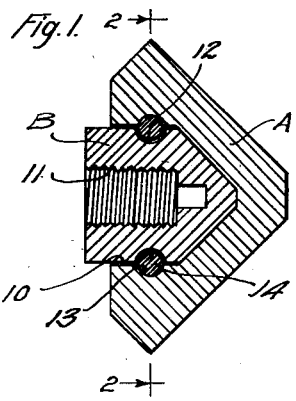
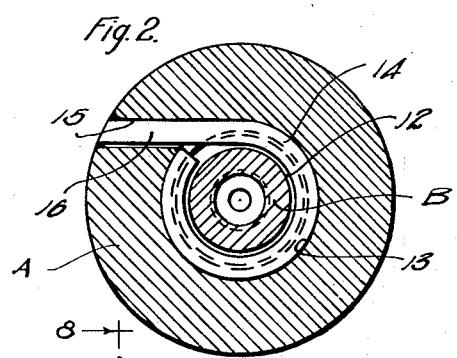
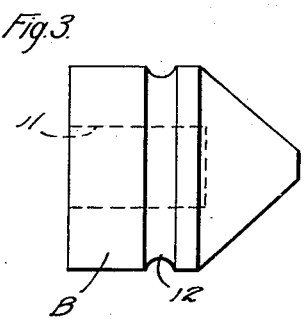
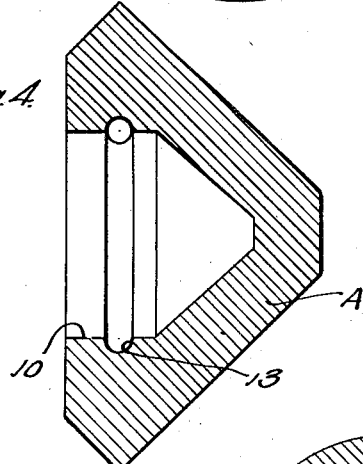
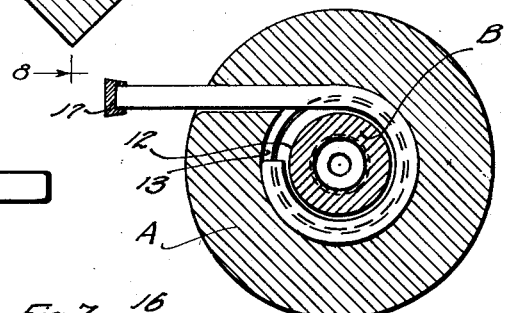
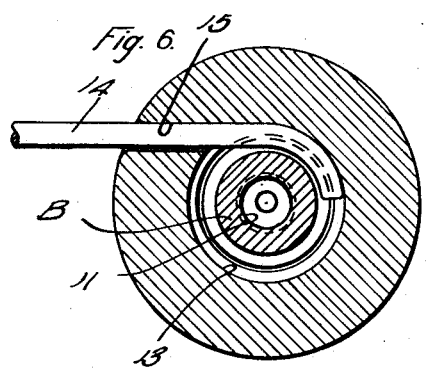
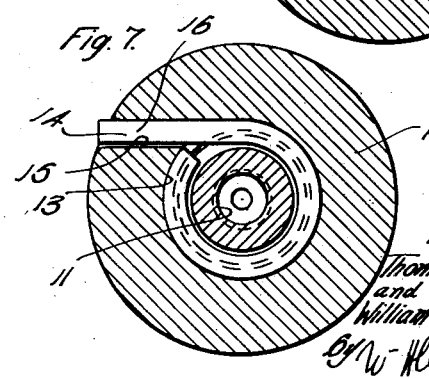

Patented Feb. 28, 1933

1,899,343

UNITED STATES PATENT OFFICE

THOMAS O. MACKEY, OF WILLOWBROOK, AND WILLIAM DONALDSON, OF HUNTINGTON PARK, CALIFORNIA, ASSIGNORS TO WIEMAN-KAMMERER-WRIGHT COMPANY, INCORPORATED, OF HOLLYDALE, CALIFORNIA, A CORPORATION OF CALIFORNIA

METHOD OF MAKING A CONNECTION

Application filed June 14, 1930. Serial No. 461,201

This invention relates to a method of making a connection, and it is a general object of the invention to provide a simple, practical, and inexpensive method of making a connection between machine parts, or the like.

It is often desirable to connect adjoining parts of various machines and manufactures securely and in a manner so that there is no danger of the connection being broken or loosening either through use or deliberate intent. We will refer to connections for connecting parts of various lock constructions, safes, well boring tools and parts of various other devices. Throughout the following detailed description of the invention we will confine the disclosure to one simple application of the invention wherein it is employed to make a connection between two adjoining parts of a well drilling tool. It is to be understood that the invention is not to be considered as limited in its scope to the particular application of the method set forth in the following disclosure.

An object of the invention is to provide a method of making a connection between two parts whereby the parts are connected so that they cannot possibly become disconnected through working of the parts, vibration or other causes, and are separable only upon failure or excessive wearing of the parts.

Another object of the invention is to provide a method of making a connection of the character mentioned in which it is not necessary to move the parts to be connected relative to one another or in any other manner while making the connection.

Another object of the invention is to provide a method of making a connection of the character mentioned that may be easily and quickly carried out without employing special or expensive equipment.

By the method provided by the present invention two parts may be connected so that they are free for relative rotational movement and are permanently held against separation.

The various objects and features of the invention will be best and more fully understood from the following detailed description of a typical mode of carrying out the invention, throughout which description reference will be had to the accompanying drawing, in which:

Fig. 1 is a detailed sectional view of an assembly of parts made in accordance with the method provided by the present invention. Fig. 2 is a transverse detail sectional view of the assembly being a view taken as illustrated by line 2—2 on Fig. 1. Fig. 3 is an enlarged view of one of the parts of the assembly being a view of the inner part taken alone. Fig. 4 is a transverse sectional view of the outer part of the assembly. Fig. 5 is a side elevation of the connecting member embodied in the connection. Fig. 6 is a transverse sectional view of the parts entering into the connection being a view illustrating the connecting member at the start of its insertion between the two parts to be connected. Fig. 7 is a view similar to Fig. 6 illustrating the connecting member in operating position between the parts. Fig. 8 is a view similar to Fig. 6 showing a protecting or driving cap on the outer end of the connecting member.

The method provided by the present invention may be employed to connect adjoining parts of various forms of devices or machines. The method is particularly useful in making a permanent connection between adjoining parts, which connection may be such as to permit relative movement between the parts. For example, it may be employed to make a connection between two adjoining parts in which the parts are free for relative rotational movement and are permanently connected or associated. For the purpose of facilitating a complete understanding of the invention, we will describe it as employed to connect two parts of a well boring tool, namely, a cutter and a cutter mounting bushing of a well drill. We will describe a form of the invention which provides a construction or connection which permits relative rotation between the connected parts, that is, between the cutter and the mounting bushing of a drill. The invention is not to be construed as restricted to the particular form of connection nor to the particular application of the connection about to be described.

To facilitate a clear and complete understanding of the method provided by the present invention the parts to be connected and the finished or completed connection will be described in detail.

In the drawing we have shown a typical form of roller cutter A suitable for a rock drill, or the like, and a mounting bushing B for rotatably mounting or carrying the cutter A. The parts A and B are related and formed to be fitted together one within the other. The cutter or part A is the outer part, while the bushing or part B is the inner part and may be in the form of a typical cutter mounting bushing. Each of the parts A and B is preferably integral, that is, the parts of each of the parts A and B associated in any manner with the connection about to be described are preferably solid or integral. The outer part or cutter A may be substantially conical in its general configuration. The cutter or outer part A has an opening 10 of round cross section extending into it from its base to receive or carry the bushing or inner part B. The bushing or inner part B is of round cross sectional configuration and fits the opening 10 of the part A with suitable clearance to permit free rotation of the part A relative to the part B. A screw threaded socket 11 may be provided in the part B to receive a stud or like mounting member for mounting the bushing B on a drill, or the like.

The connection provided by or formed by the method of the present invention includes an annular recess or seat 12 on the exterior of the inner part B, an annular recess or groove 13 in the walls of the opening 10 adapted to register with the recess 12 of the inner member B, and a connecting bar or member 14 to be inserted through a passage or opening 15 to occupy the space formed by the registering recesses 12 and 13 to connect the parts A and B. In the particular case illustrated where the parts A and B are to be connected for relative rotation the recess 12 is preferably annular extending completely around the exterior of the part B, and the recess 13 is annular or continuous around the walls of the opening 10. In the form of assembly illustrated the recesses 12 and 13 are of substantially semi-circular cross sectional configuration so that they form an opening of substantially round cross section when in register. The connecting member 14 may also be of round cross section to effectively occupy the space formed by the grooves 12 and 13 and is in the nature of an elongated part or rod. The connecting member 14 is arranged in the opening formed by the grooves 12 and 13 so that it is free of the inner part B, and may be arranged in the opening so that it seats tightly in the recess 13 of the part or cutter A. The rod or connecting member 14 preferably extends the complete extent of the recess 13, and in accordance with the preferred form of the invention closes or occupies the passage 15. The portion 16 of the member 14 occupying the passage 15 in the part A acts to hold the connecting member 14 against movement relative to the part A.

The method of the present invention provides for the insertion of the locking or connecting member 14 through the passage 15 and into the opening formed by the registering recesses 12 and 13. More specifically, the invention provides for the insertion of one end part of the member 14 in the passage 15 and the forcing or driving of the member 14 through the passage and into operative or connecting position in the space provided by the registering recesses 12 and 13 where it permanently connects the two parts A and B. In the particular form of assembly illustrated in the drawing the passage 15 is provided in the outer part A and is tangential to the opening or space formed by the registering grooves 12 and 13. The passage 15 extends from the exterior of the part A to the recess 13 and is of sufficient diameter to slidably pass the connecting member 14.

The driving or forcing of the member 14 into operating or connected position between the parts A and B is accomplished by inserting one end part of the member 14 in the passage 15 and then forcibly acting inwardly on the member or driving inwardly on the member from its outer or projecting end so that it is forced into the opening provided by the grooves 12 and 13 and is caused to conform to the configuration of the opening. The parts A and B may be held stationary while the connecting member 14 is arranged between them. The connecting member 14 may be forced or worked into position between the parts A and B in any suitable manner. For example, its outer end may be struck several blows with a hammer or like tool. In the particular case illustrated the member 14 as initially formed is a straight bar so that blows or force applied to its outer end while being driven into the space between the members A and B is effectively transmitted to the entering portion of the member. The forcing or working of the member 14 into the opening provided by the recesses 12 and 13 causes it to be curved to conform to the curvature of the recess 13 in the outer A so that it seats against the walls of the recess 13 and is free of the exterior of the inner part B. This clearance between the connecting member 14 and the inner part B permits free relative rotation between the connected parts A and B. The manner in which the connecting member 14 engages and conforms to the configuration of the recess 13 of the outer member at the start of the connecting operation will be apparent from an inspection of Fig. 6 of the drawing.

In Fig. 7 of the drawing the member 14 is shown in a position where it extends completely around the member B so that it is seated in the recess 13 and clearance is provided for between the member 14 and the walls of the recess 12 of the inner part B. It is preferred that the member 14 be made sufficiently long to extend the full extent of the recess 13 and so that its outer end part extends or projects through the passage 15 when in the operative or connecting position. By thus forming the member 14 sufficiently long to project from the opening or passage 15 when in its final or operative position the outer end of the member is readily accessible to be acted upon or receive blows for forcing the member to the proper connecting position between the members A and B. The projecting outer part of the member 14 may be cut off or removed when the member is in position between the parts A and B and the end of the member 14 may be made substantially flush with the exterior of the part A. The end of the member 14 may be welded in the outer part of the opening 15 or otherwise made to close the passage 15 to prevent the entrance of foreign material between the parts A and B.

To forcibly insert or arrange the member 14 between the parts A and B, in the manner described above, it is obvious that the member must be more or less malleable or ductile so that it can be made to conform to the shape of the opening formed by the registering recesses 12 and 13. In the preferred manner of carrying out the method of the present invention, we employ a connecting member 14 formed of a material or metal that is not sufficiently malleable or pliable under normal conditions to be forced or inserted between the parts A and B. We prefer to use a connecting member formed of iron, steel, or like metal. The member 14 formed of a metal of this character is heated to a temperature at which it is readily bent or flexed and while in the heated condition is forced into the opening formed by the recesses 12 and 13 and caused to seat against the walls of the recess 13. The heated member 14 may be thus forced into the space between the parts A and B by applying blows or force to its outer or projecting end.

It has been found that it requires little force or few blows to cause the member to be forced between the parts A and B when in the heated condition. As the connecting member 14 tends to tightly seat outwardly against the wall of the recess 13 when it is forced between the parts A and B and is at all times free of the inner member B, it will, upon cooling be sufficiently free of or spaced from the inner member B to provide sufficient clearance to permit the free rotation of the part A relative to the part B. The outer portion 16 of the member which is arranged in the opening 15 acts to hold the connecting member 14 stationary relative to the part A when the parts are moved or rotated relative to one another.

In handling or forcing the heated member 14 into the space between the parts A and B the extreme outer end of the member 14 which is acted upon may be quenched or cooled so as to be in approximately its normal hard or rigid state to prevent it from becoming distorted by the force applied to it to force the member between the parts A and B. A protecting or driving cap 17 may be removably arranged over the extreme outer end of the connecting member 14 while in the heated condition during its insertion between the parts A and B to directly receive the necessary blows or force and thus prevent the connecting member from being distorted. By applying the member 14 when in the heated and pliable condition, it readily conforms to the configuration of the recess 13 without being distorted in its cross sectional configuration and without being fractured to have checks or faults formed in its material. It will be obvious that the member 14 may be inserted between the parts A and B to securely and permanently connect them without in any way affecting their temper or other qualities. Further, it is to be noted that the member 14 may be arranged in connecting position between the members A and B without moving the parts A and B in any way or without altering the relative positions of the parts A and B.

From the foregoing detailed description it will be apparent that the method of the present invention provides a connection that is secure and dependable and which is not subject to failure. Further, it is to be noted that the method may be employed in connecting large members or parts of large heavy machines or devices without in any way handling or moving the parts to be connected. The method may be carried out effectively without the use of special equipment or tools. It is to be noted that the connecting member 14 cannot become displaced or removed from between the members A and B and that the member 14 is disposed or arranged between the parts A and B in a manner so that it does not in any way impair or retard the free rotation of the parts A and B relative to one another. The connecting member 14 may seat against the wall of the recess 13 after cooling and is held stationary relative to the part A by its portion 16 carried in the opening 15 while it is free of the inner part B, thus permitting free relative rotation between the parts A and B while dependably and positively preventing separation of the parts.

Having described only a typical preferred form of our invention, we do not wish to limit ourselves to the specific details set forth, but wish to reserve to ourselves any changes or variations that may appear to those skilled in the art or fall within the scope of the following claims.

Having described our invention, we claim:

1. The method of connecting two parts, one fitting around the other and having a space between them including, heating an elongated normally rigid body of metal to render it malleable or pliable, inserting one end of the body in the space while at a high temperature, and then delivering force to the other end of the heated body to cause the body to occupy the space.

2. The method of connecting two parts, one fitting around the other and having a space between them including, heating a normally rigid bar of metal to render it malleable or pliable, inserting an end of the heated bar of metal in an opening in one part communicating with the space, then striking the outer end of the car to force the bar into space to occupy the space and opening.

3. The method of connecting two parts, one fitting around the other and having an annular space between them including, heating a normally rigid bar of metal to render it malleable or pliable, inserting an end of the heated bar of metal in an opening in the outer part communicating with the space and tangential to the space, and imparting force to the other end of the heated bar to force it into a position where it takes the shape of and occupies the space and the opening.

In witness that we claim the foregoing we have hereunto subscribed our names this 23rd day of May, 1930.

THOMAS O. MACKEY.
WILLIAM DONALDSON.